(12) United States Patent
Harp (10) Patent No.: US 8,858,681 B2
(45) Date of Patent: Oct. 14, 2014

(54) PATTERNED POROUS VENTING MATERIALS

(75) Inventor: Gary P. Harp, Newark, DE (US)

(73) Assignee: W. L. Gore & Associates, Inc., Newark, DE (US)

( * ) Notice: Subject to any disclaimer, the term of this patent is extended or adjusted under 35 U.S.C. 154(b) by 779 days.

(21) Appl. No.: 11/738,772

(22) Filed: Apr. 23, 2007

(65) Prior Publication Data

US 2008/0257153 A1 Oct. 23, 2008

(51) Int. Cl.
*B01D 53/22* (2006.01)
*B01D 39/16* (2006.01)
*B01D 46/54* (2006.01)

(52) U.S. Cl.
CPC ...... *B01D 46/543* (2013.01); *B01D 2239/1258* (2013.01); *B01D 2279/35* (2013.01); *B01D 39/1623* (2013.01); *B01D 2239/1208* (2013.01); *B01D 2239/0478* (2013.01)
USPC ............. 95/45; 95/43; 95/46; 347/86; 347/87

(58) Field of Classification Search
USPC ............................... 95/43, 45, 46; 347/86–87
See application file for complete search history.

(56) References Cited

U.S. PATENT DOCUMENTS

| | | | |
|---|---|---|---|
| 2,760,863 A * | 8/1956 | Plambeck, Jr. ................ 430/306 |
| 3,341,497 A | 9/1967 | Sherman et al. |
| 3,354,022 A | 11/1967 | Dettre et al. |
| 3,953,566 A | 4/1976 | Gore |
| 3,962,153 A | 6/1976 | Gore |
| 4,096,227 A | 6/1978 | Gore |
| 4,187,390 A | 2/1980 | Gore |
| 4,754,009 A | 6/1988 | Squire |
| 4,853,013 A * | 8/1989 | Rio et al. ........................... 96/6 |
| 4,945,125 A | 7/1990 | Dillon et al. |
| 5,026,446 A * | 6/1991 | Johnston et al. ............... 156/153 |
| 5,066,683 A | 11/1991 | Dillon et al. |
| 5,116,650 A | 5/1992 | Bowser |
| 5,156,780 A | 10/1992 | Kenigsberg et al. |
| 5,157,058 A | 10/1992 | Dillon et al. |
| 5,183,705 A * | 2/1993 | Birkholz et al. ............... 428/343 |
| 5,271,839 A | 12/1993 | Moya et al. |
| 5,343,434 A | 8/1994 | Noguchi |
| 5,352,513 A | 10/1994 | Mrozinski et al. |
| 5,362,553 A | 11/1994 | Dillon et al. |
| 5,370,836 A | 12/1994 | Yokoyama et al. |

(Continued)

FOREIGN PATENT DOCUMENTS

DE 19653890 A1 * 6/1998
EP 0 307 123 3/1989

(Continued)

OTHER PUBLICATIONS

Hughes "A new Way to Emboss Leather" Popular Science Monthly, Nov. 1929, p. 177.*

(Continued)

*Primary Examiner* — Jason M Greene
*Assistant Examiner* — Anthony Shumate
(74) *Attorney, Agent, or Firm* — Amy L. Miller (57) ABSTRACT

A patterned gas permeable venting material is affixed within a venting apparatus which has an opening. The venting material forms a liquid tight, gas permeable seal of the opening. The patterned material comprises a PTFE membrane of porosity less than 80% and with a surface indentation of depth greater than 12 microns.

21 Claims, 6 Drawing Sheets

(56) References Cited

U.S. PATENT DOCUMENTS

| | | | |
|---|---|---|---|
| 5,462,586 A | 10/1995 | Sugiyama et al. | |
| 5,466,509 A | 11/1995 | Kowligi et al. | |
| 5,522,769 A * | 6/1996 | DeGuiseppi | 454/270 |
| 5,539,072 A | 7/1996 | Wu | |
| 5,554,414 A | 9/1996 | Moya et al. | |
| 5,627,042 A | 5/1997 | Hirose et al. | |
| 5,919,878 A | 7/1999 | Brothers et al. | |
| 5,942,320 A * | 8/1999 | Miyake et al. | 428/216 |
| 5,988,426 A | 11/1999 | Stern | |
| 6,159,565 A | 12/2000 | Campbell et al. | |
| 6,196,708 B1 | 3/2001 | Rogers | |
| 6,287,438 B1 * | 9/2001 | Knoll | 204/409 |
| 6,355,081 B1 | 3/2002 | Wang et al. | |
| 6,410,084 B1 | 6/2002 | Klare et al. | |
| 6,627,291 B1 | 9/2003 | Clark et al. | |
| 6,638,610 B1 | 10/2003 | Yao | |
| 6,676,993 B2 | 1/2004 | Klare | |
| 6,683,126 B2 | 1/2004 | Keller et al. | |
| 6,737,489 B2 | 5/2004 | Linert et al. | |
| 6,764,745 B1 * | 7/2004 | Karasawa et al. | 428/141 |
| 6,780,497 B1 | 8/2004 | Walter | |
| 2001/0018096 A1 | 8/2001 | Klare | |
| 2003/0061938 A1 * | 4/2003 | Kunstadt et al. | 96/4 |
| 2005/0048261 A1 * | 3/2005 | Nishii et al. | 428/138 |
| 2005/0061663 A1 | 3/2005 | Chen et al. | |
| 2005/0124242 A1 | 6/2005 | Norvell et al. | |
| 2005/0263479 A1 | 12/2005 | Smolko et al. | |
| 2006/0047311 A1 | 3/2006 | Lutz et al. | |
| 2006/0165935 A1 * | 7/2006 | Studer et al. | 428/40.1 |
| 2006/0201348 A1 * | 9/2006 | Lee | 101/11 |
| 2007/0231542 A1 | 10/2007 | Deng et al. | |

FOREIGN PATENT DOCUMENTS

| | | |
|---|---|---|
| EP | 0 513 392 | 11/1992 |
| EP | 0 729 901 | 9/1996 |
| EP | 1 216 089 | 6/2002 |
| WO | WO 94/13469 | 6/1994 |
| WO | 96/32635 | 10/1996 |
| WO | WO 02/00333 | 1/2002 |
| WO | 2004/091747 | 10/2004 |
| WO | WO 2006/127946 | 11/2006 |

OTHER PUBLICATIONS

Popular Science Monthly "Embossing" Dec. 1941, p. 177.*
Scrivano "Creative surface design: painting, stamping, stenciling, and embossing fabric & more" The Taunton Press 2002, pp. 122-129.*
Translation of DE 19653890 A1.*
Convert-me "Centimeter of Water Conversion Chart" <http://www.convert-me.com/en/convert/pressure/cmwater.html>pp. 1-2, 1996.*
International Search Report for PCT/US2008/005159.

* cited by examiner

PATTERNED POROUS VENTING MATERIALS

FIELD OF THE INVENTION

The present invention relates to patterned porous gas permeable materials wherein the pattern aids in retaining substantial gas permeability of the material after liquid exposure. More particularly, the invention relates to use of such patterned materials in venting systems containing viscous fluids of low surface tension.

BACKGROUND OF THE INVENTION

Many enclosures require venting to an atmosphere external to an enclosure to relieve any pressure differential between the internal volume of the enclosure and the external atmosphere. Such venting may be required due to temperature fluctuations, altitude changes, and vapor pressure of liquid contained therein. Vents allow the flow of gas for pressure equalization while preventing the entry of liquid and particulate contamination. Market sectors which use porous materials as vents include, but are not limited to automotive, electronics, industrial, medical, and packaging. Expanded PTFE (ePTFE) is a known porous vent material in these applications. However, when these vent materials are exposed to viscous fluids of low surface tension, a loss in gas permeability may be observed. Residual liquid film or droplets remaining on the vent material may restrict the vent area available for gas flow. The fluid can dry and harden on the surface of the vent material, leaving an impermeable film layer on the entire surface, thereby rendering the vent inoperable by eliminating gas permeability. As used in this application, the term "gas permeability" means the property of a material having two sides allowing a gas to move from a first side to the second side when the material is subject to a differential pressure of such gas across it. Air permeability, for example, can be characterized by Gurley number.

There exists a need for a porous material that has adequate air flow after fluid exposure, especially in cases where the vent is exposed to a viscous fluid of low surface tension.

SUMMARY

In one aspect, a venting apparatus having an opening therein for venting an enclosure is provided. The venting apparatus comprises a porous venting element affixed within the venting apparatus and forming a liquid-tight, gas-permeable seal of the opening. The porous venting element has a porosity of less than 80% and comprises at least one surface indentation having a z axis differential of at least 12 microns.

In another aspect, a method of venting a liquid tight enclosure is provided. The method comprises providing an opening in the enclosure, providing a porous polymer having a porosity of less than 80%, forming indentations in a portion of a surface of said porous polymer having a depth greater than 12 microns, and covering the opening with the porous polymer to form a liquid-tight and gas-permeable seal of the opening.

In a further aspect, a patterned oleophobic article, after exposure to fluid challenge has an air flow recovery greater than 5% over the base un-patterned article. More preferably, the air flow recovery is greater than 10% over the base un-patterned article. Most preferably, the air flow recovery is greater than 15% over the base un-patterned article. The base un-patterned article herein has no flow recovery (0%) after exposure to fluid challenge.

In yet another aspect, a venting apparatus having an opening therein for venting an enclosure is provided. The venting apparatus comprises a porous venting element affixed within and forming a liquid-tight, gas-permeable seal of the opening. The porous venting element comprises at least one surface indentation such that the venting apparatus provides effective pressure decay of the porous venting element after liquid contact.

In another aspect, the patterned hydrophobic article, after exposure to fluid challenge has an air flow recovery greater than 5% over the base un-patterned article. More preferably, the air flow recovery is greater than 10% over the base un-patterned article. Most preferably, the air flow recovery is greater than 15% over the base un-patterned article. The base un-patterned article herein has about 17% flow recovery after exposure to fluid challenge.

DETAILED DESCRIPTION

Patterned porous venting materials of this invention provide substantial gas permeability after exposure to viscous fluids of low surface tension. By "substantial gas permeability" is meant an air flow recovery (after fluid exposure) of at least 5% greater than that of the un-patterned base material. By "viscous fluids of low surface tension" is meant fluids with a viscosity greater than 50 cP (Centipoise) and surface tension less than 35 mN/m. In applications which involve such fluids, patterned porous venting materials overcome disadvantages of known venting materials.

The patterned porous venting materials can be used in a venting apparatus. A venting apparatus may include a vent body having an opening therein to allow venting. The patterned porous venting materials may be affixed to the body to form a liquid-tight, gas-permeable seal of the opening. The venting apparatus may be used in a liquid-tight enclosure. By "liquid-tight" is meant a seal or enclosure that can withstand a water entry pressure of at least 0.5 psi without leakage. Examples include a container for enclosing liquids or an electronic enclosure as in computer disk-drives, automotive engine control units, or automotive head-lamps.

Figure 2:
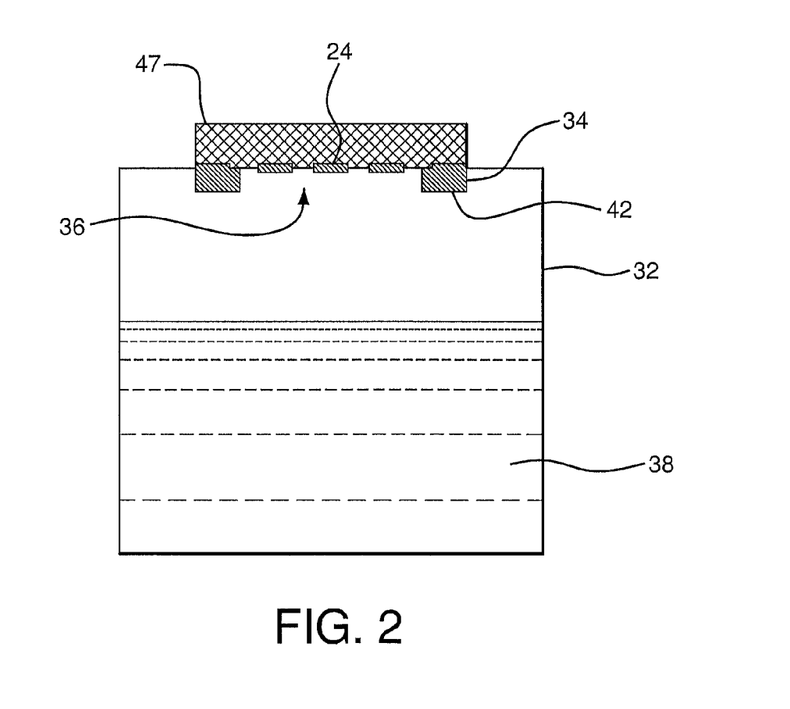
FIG. 2 shows a vented enclosure.

The vent body 42 may take the form of an insert, cap, or a molded part. In other aspects, as represented in FIG. 2, an enclosure may have a vent body incorporated therein. In simple form, an enclosure may have an opening with a porous vent material sealed over it to provide venting.

Preferably, the vent body is constructed from polymeric materials, which facilitate easy processing including heat sealing of the porous composite article to the body. This vent body may be constructed in various shapes and forms and installed in any orientation (vertical, horizontal, or inclined at an angle) on to the enclosure. The means for attachment of the vent body to the enclosure depends on the intended venting application. Exemplary attachment means include interference fittings, threads or adhesives. As such, the vent body may incorporate barbs, threads and the like to improve attachment.

Figure 1:
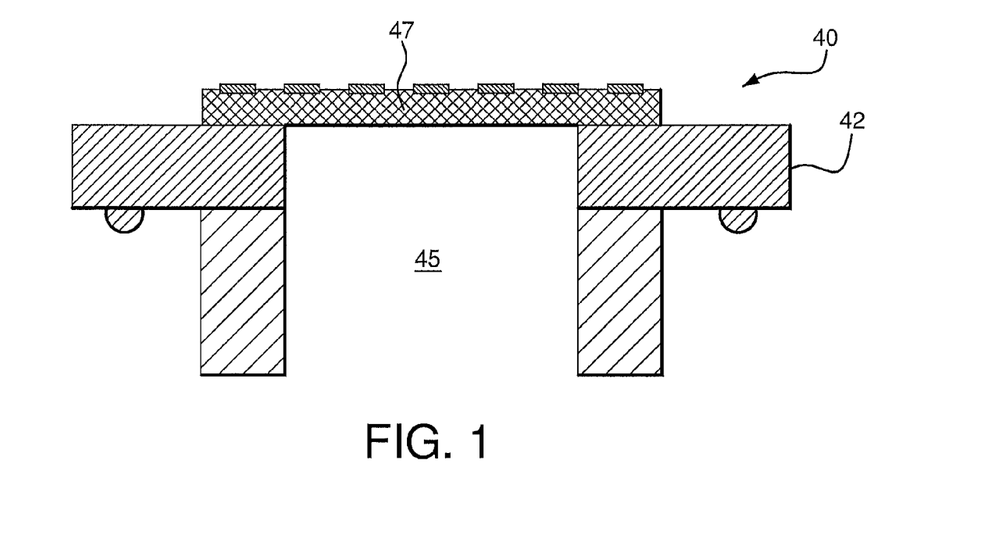
FIG. 1 shows a venting apparatus.

As shown in FIG. 1, the venting apparatus 40 may include a vent body 42 having a passageway 45 for a gas, and a venting material 47. Venting material 47 may form a gas permeable liquid-tight seal of passageway 45.

The patterned porous venting materials may be used as a venting element in enclosures. As shown in FIG. 2, the venting material 47 may be advantageously used to form a liquid-tight seal 34 of an opening 36 in an enclosure 32 for containing or excluding a liquid 38. In the embodiment illustrated, the venting material 47 provides gas permeability necessary for gas expansion, off-gassing of chemicals, and the like. The surface of the porous venting material 47 has an embossed surface pattern 24. In these applications, such as liquid detergent containers the liquid is contained, yet the patterned porous venting material provides gas permeability. The gas permeability may prevent enclosure deformation or rupture due to thermal cycling, or allow for off gassing of the liquid. In other embodiments, the patterned porous venting materials may be used to prevent liquid entry into the enclosure.

The patterned porous venting material may be organic or inorganic in nature. Preferably, materials comprising porous polymeric membranes are used. Preferred porous polymeric membrane materials include, but are not limited to polymers from monomers containing Ultrahigh Molecular Weight Polyethylene, Polypropylene, Polyvinylidene Fluoride (PVDF), Polycarbonate, Cellulose acetate, Polysulfone, Polyethersulfone, tetrafluoroethylene/hexafluoropropylenecopolymers (FEP), tetrafluoroethylene/perfluoroalkyl vinyl ether copoylmers (PFA), and PTFE. More preferably, materials comprising porous PTFE are used.

Figure 3:
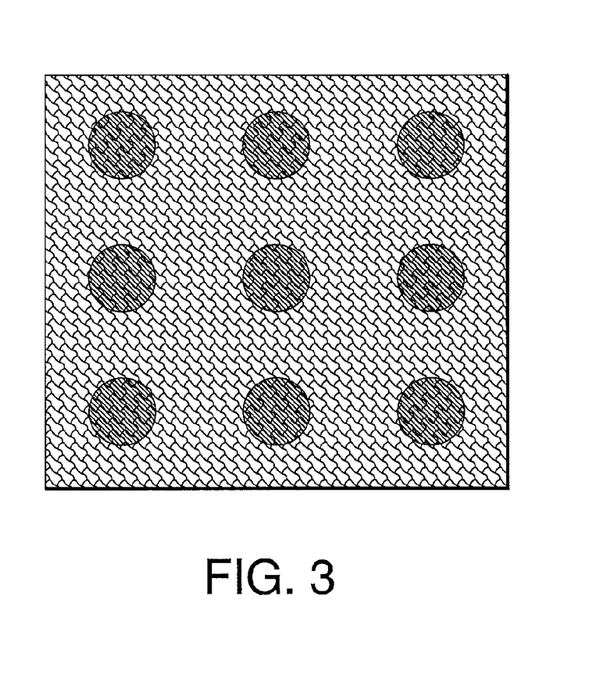
FIG. 3 shows the surface topography of a patterned vent material.
Figure 4:
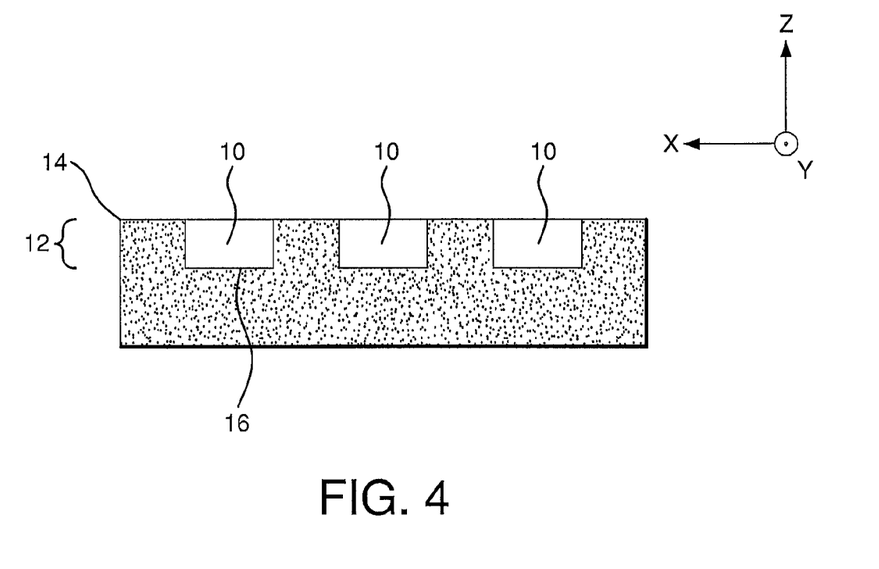
FIG. 4 shows a cross section of a patterned porous venting material.
Figure 5A:
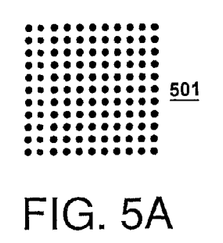
FIGS. 5A, 5B, 5C, 5D, 5E, 5F, 5G, 5H, 5I and 5J describe exemplary pattern shapes.
Figure 5B:
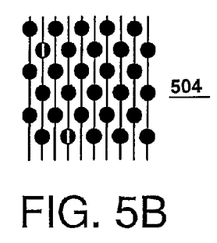
Figure 5C:
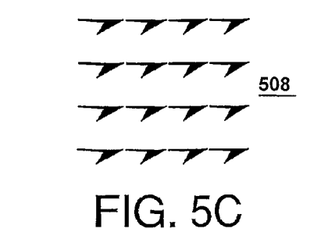
Figure 5D:
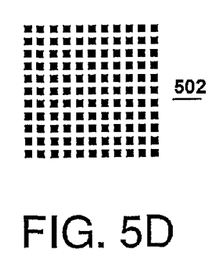
Figure 5E:
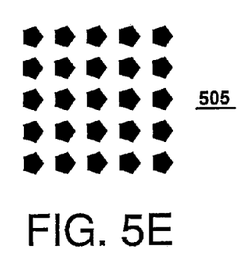
Figure 5F:
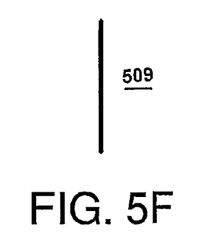
Figure 5G:
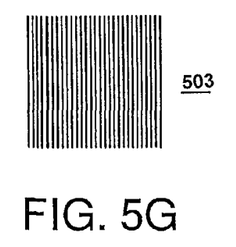
Figure 5H:
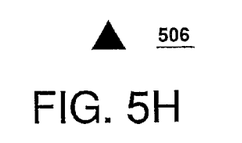
Figure 5I:
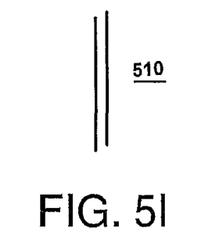
Figure 5J:
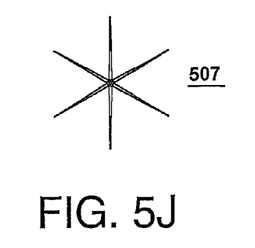

FIG. 3 depicts a top view of a patterned venting material and FIG. 4 shows a partial cross section of a patterned venting material. The patterned topography may be defined by one or more indentations (10) in the material surface. These indentations can be further defined in three dimensions using a Cartesian x,y,z coordinate system as shown in FIG. 4. The two dimensional x-y plane corresponds to the vent material's outer surface and is orthogonal to the direction of the material thickness (z axis). The z axis is parallel to the direction of the vent material thickness and is orthogonal to the surface of the vent material. The z axis differential (12) or depth of the indentation is the distance from the top of the patterned surface (14) to the inner most surface (16) of the indentation. The z axis differential can be measured using optical profilometry.

Patterned venting materials with a z axis differential greater than 12 microns are preferred. Furthermore, venting materials with a z axis differential greater than 20 microns are more preferred. The pattern and shape of indentations are defined in the two dimensional x-y plane of the venting material surface and may take any form. One or more indentations comprise an array of indentations. Indentations or arrays of indentations which cover an area (in the x-y plane of the surface of the venting material) between 25 microns and five square centimeters are preferred. Indentations or arrays of indentations may have area coverage up to 90% of the venting material. For a given surface area in the x-y plane of the venting material, percent area coverage is defined as the area occupied by the indentations or arrays of indentations relative to the entire area of the surface of the venting material.

Preferred pattern shapes may be selected from the group of simple single shapes including, but not limited to squares, circles, lines, polygons, amoeboids, splines of finite width, and combinations thereof. Patterns may also take complex shapes which include complex combinations of said simple single shapes. The pattern shapes may be regular or irregular. Patterns can be of nonstandard shapes with continuous curves which alternate directions at regular intervals or at random. Other shapes may also include alpha or numeric symbols and characters. Furthermore, the patterns may be created from combinations of the above said shapes including simple regular arrays and more complex arrays created to simulate random distributions or fractal patterns.

Exemplary pattern shapes include, but are not limited to those described in FIGS. 5A, 5B, 5C, 5D, 5E, 5F, 5G, 5H, 5I and 5J. Shapes described in FIGS. 5A, 5B, 5C, 5D, 5E, 5F, 5G, 5I and 5J include simple shapes like that of a triangle (506), star (507), arrays of simple shapes as shown in an array of circles (501), array of squares (502), array of rectangles (503), array of pentagons (505), interconnected circles (504), straight lines (509) and parallel lines (510) as well as some non-standard combinations including patterns shown in (504) and (508).

The patterns of porous, non-porous regions on the vent material surface may be realized through techniques including, but not limited to embossing with pressure and or heat, laser ablation, masked plasma treatment, mechanical scratching or engraving, micro-contact printing, masked chemical vapor deposition, masked coatings, ink-jet printing and sand blasting. In general, patterning conditions should be controlled so as not to perforate the material in a manner that compromises its impermeability to fluids used in venting applications.

Venting materials can be embossed with stamps photolithographically patterned from 1 oz or 5 oz copper and a polymeric photomask. Embossing is carried out by pressing the patterned stamp on to the venting material using pressure. A hydraulic press may be used to create a compressive force such that the pattern is embossed on to the surface of the venting material.

The pattern may also be achieved through lamination of the porous venting material to open materials like meshes, scrims, non-wovens, etc. Lamination of the venting material to an open material involves heat and pressure alone or is in conjunction with a polymeric adhesive material. The adhesive may be in the form of a web, a powder, hot melt or liquid that is rolled off, coated, sprayed or printed in a dot matrix pattern. The above materials are run through nip rollers applying a compressive force; the rollers may be heated to melt the adhesive and create bonding of the vent material and the open material. The shape of the pattern thus created on the venting material is a function of the nature of the open material.

The patterned porous venting materials can be rendered oleophobic, thereby making them applicable in certain venting applications which require resistance to low surface tension liquids. By "oleophobic" is meant an article with an AATCC Test method 118-2002 oil rating of at least 2. One of several techniques include coating the patterned material using a solution of perfluorodioxole polymer as described in U.S. Pat. No. 5,116,650. The coating may also be applied to the vent material before creating the pattern.

The patterned porous articles can be constructed as a laminate. The laminate may be constructed by supporting the patterned porous membrane on a backer. Backers provide more structural support and may also aid in attachment of the vent material to the enclosure. Suitable air permeable backers can be in the form of air permeable media like knits, non-wovens, scrims, melt-blowns, woven fabrics, meshes, foams, etc. Backers may be affixed to the patterned porous vent material through known methods such as hot-roll lamination, adhesives, ultrasonic bonding.

The present invention will be further described with respect to the non-limiting examples provided below.

EXAMPLES

Testing Methods
Surface Tension Measurement

Surface tension of a challenge fluid was measured using a Kruss K12 hardware bios version 4.04 running the Kruss Laboratory Desktop Software version 2.0.0.2207 using the Whilhelmy plate method. Whilhelmy plate immersions were conducted with flamed Kruss standard platinum plate and the software default dip parameters.

Viscosity Measurement

Viscosity was measured using a Brookfield DVII+ viscometer with a UL low volume spindle and tube accessory. Viscosities are reported in centipoise (cP) for a temperature of 22.5 degrees Celcius, at 30 RPM, and a shear rate of 36.7 second$^{-1}$. Viscosities were read after five minutes at 30 RPM for samples which had previously been run at the maximum RPM allowed by torque.

Density Measurement & Porosity Calculations

Un-patterned vent material samples were die cut to form sections of a certain length and width. The mass of the section was measured using an analytical balance. The thickness of the section was measured using a snap gauge. Using these data, density was calculated with the following formula:

$$\rho = \frac{m}{w*l*t}$$

in which $\rho$=density (g/cc); m=mass (g); w=width (cm); l=length (cm); and t=thickness (cm).

Porosity of the un-patterned base venting material was expressed in percent porosity and was determined by subtracting the quotient of the average density of the un-patterned vent material (described earlier herein) and that of the bulk density of PTFE from 1, then multiplying that value by 100%. For the purposes of this calculation, the bulk density of PTFE was taken to be 2.2 g/cc.

Challenge Fluids

Three representative challenge fluids were formulated and used for air flow recovery testing and pressure decay testing after fluid exposure. Properties of these fluids are listed in the table below. For oleophobic articles with an oil rating of at least 2, fluids V57S24 and V57S27 were used for airflow recovery and pressure decay testing. For hydrophobic articles, fluid V51S34 was used. By "hydrophobic" is meant materials that have a surface that is extremely difficult to wet with water, with water contact angles in excess of 90 degrees.

| Fluid | Viscosity (cP) | Surface Tension (mN/m) | Components (parts per unit weight) |
|---|---|---|---|
| V57S27 | 57 | 27 | Distilled Water: (92) Tergitol ® TMN6: (1) PVP: (7) |
| V57S24 | 57 | 24 | Distilled Water: (92) Tegopren ® 5847: (1) PVP: (7) |
| V51S34 | 51 | 34 | Distilled Water: (19) Tween ® 80: (1) Glycerol: (80) |

The components were mixed, stirred for one hour and then used immediately for testing. The components used in the formulated fluids are as follows: distilled water, Glycerol (99.5+% Spectrophotometric Grade, Sigma-Aldrich Chemical, Catalog Number 191612), PVP (Polyvinylpyrrolidone 1,300,000 Mw, Sigma-Aldrich Chemical, Catalog #437190), Tween® 80 (Sigma Aldrich Chemical, Catalog Number 274364), Tegopren® 5847 (Degussa Chemical) and Tergitol® TMN6 (Dow Chemical).

Air Flow Recovery Testing After Fluid Exposure

Figure 6:
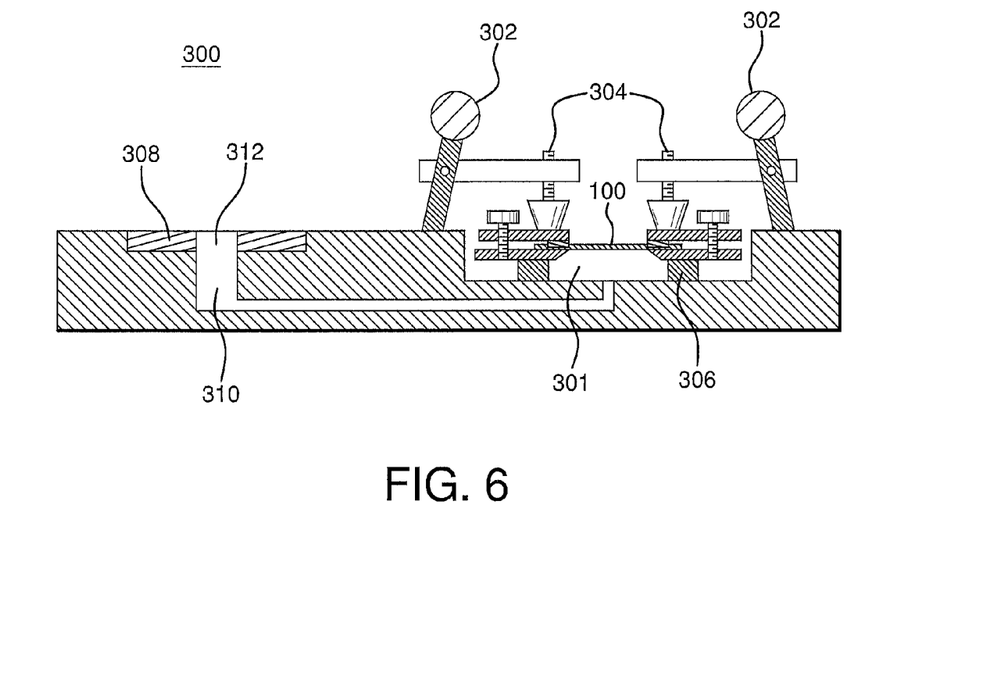
FIG. 6 and FIG. 6a show drawings of the airflow recovery test apparatus.
Figure 6A:
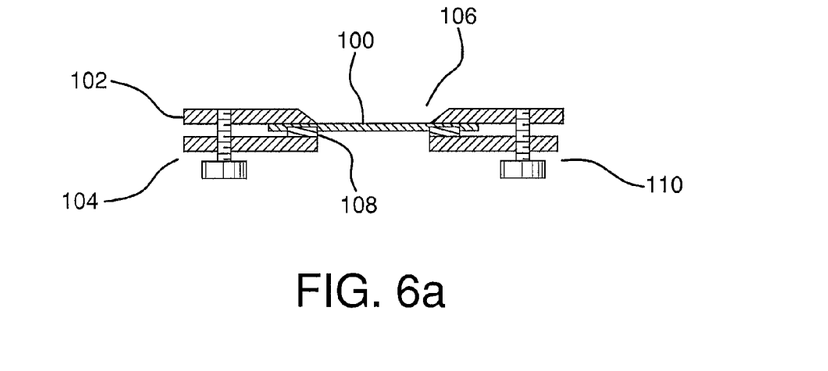

FIGS. 6 and 6a illustrate the apparatus used for airflow recovery testing. Vent material 100 is sealed between upper plate 102 and lower plate 104. The plates each include an orifice of diameter 2.54 cm. The upper plate incorporates a liquid well 106. The vent material 100 is secured between the plates using a gasket 108 and thumb screws 110. The assembled plates are then secured in an adapter 300 by means of clamps 302, thumb screws 304 and a gasket 306. Adapter 300 includes an air chamber 301 and channel 310 for delivering air to it. A Telydyne Genuine Gurley™ tester (Model Number 4320) is attached to the inlet port 312 of the adapter 300 using the gasket 308.

100 cm$^3$ of air is delivered to the sample at a pressure of 12.4 cm of water and the flow time recorded in seconds. This measurement is Gurley (seconds) before fluid contact.

The plate is then removed from the adapter and the vent material is exposed to test fluid by filling liquid well 106 such that the entire surface of the vent material is covered by the fluid. This can be done by using a transfer pipette to add about 0.5 to 1.25 cm$^3$ of test fluid to the well 106. After 30 seconds, the plate assembly was flipped over and excess liquid outside of the well was wiped off (leaving about 0.1 grams of fluid in the well). The plate is set horizontally on top of a beaker with the well facing the bottom of the beaker for five minutes. The plate is then secured in the adapter 300 which is affixed to the Telydyne Genuine Gurley™ tester (Model Number 4320).

100 cm$^3$ of air is allowed to flow through the sample at a pressure of 12.4 cm of water and the flow time recorded in seconds. This measurement is Gurley (seconds) after fluid contact. In cases where airflow did not start after ten minutes in this test, the test was stopped and samples were considered not to recover as denoted by NR for no recovery of airflow. The percentage air flow recovery is then determined by using the equation:

$$\text{Air flow recovery}(\%) = \left(\frac{\text{Gurley(seconds) before fluid contact}}{\text{Gurley(seconds) after fluid contact}}\right) * 100$$

Oil Rating Test

Oil rating test was conducted in accordance with AATCC Test Method 118-2002.

Z Axis Differential

Z axis differential or depth of the indentation can be estimated by characterizing the surface topography using an optical profilometer (GFM Mikrocad, GFMesstechnik, Teltow/Berlin, Germany). Measurements were obtained with a 4 mm×3 mm x-y field of view lens. Prior to making the measurements, the instrument was calibrated for x, y and z axes resolution using appropriate standards supplied by the manufacturer; x, y, and z axes resolution were all better than 1 micron. Lighting and focus were adjusted as recommended by the manufacturer to optimize image quality prior to image collection. Topographical profiles were extracted from the acquired data using the fifth order polynomial setting in the OSCAD Software version 4.02, supplied by the manufacturer. Topographical image data files thus acquired were opened using the Solarmap software (Solarius Development Inc.) to generate histograms. Two peaks were generally observed representing the outermost surface of the material and the inner most surface of the indentation. The z axis differential was estimated based on the centers of these peaks and represents the distance from the top of the patterned surface to the inner most surface of the indentation.

Water Entry Pressure (WEP)

Water entry pressure provides a test method for water intrusion through vent bodies. The vent body is placed in a fixture and pressurized with water. A piece of pH paper may be placed on top of the vent body on the non pressurized side as an indicator of evidence for water passage. The sample is then pressurized in small increments, until a color change in the pH paper indicates water passage. The water pressure at breakthrough or entry is recorded as the Water Entry Pressure.

Pressure Decay Testing After Fluid Exposure

Samples were sealed to a vent hole (2.54 cm diameter) on a 3 liter container. The container was equipped with a pressure transducer and an air inlet port. The container was partially filled with challenge fluid and inverted so that the fluid covered the sample surface. The container was now pressurized to an initial pressure of about 1 psi using compressed air. The inlet port was then closed sealing the container except for the vent hole covered by the sample. The container was returned to its original orientation with the sample in a horizontal position, withdrawing the challenge fluid from the sample surface. After allowing the container to stand in this position for 15 minutes the residual pressure was measured. When this measured residual pressure after 15 minutes is greater than 90% of the initial pressure, the samples were considered to fail this test indicating ineffective vent function after exposure to challenge fluid. When this measured residual pressure after 15 minutes is less than 90% of the initial pressure, the samples were considered to pass this test indicating effective vent function in terms of pressure decay after exposure to challenge fluid. Results from this test are reported in terms of Pass or Fail values.

Repellant Power

The repellant power was measured using a Kruss DSA 100 video contact angle instrument running the DSA software version 1.90.0.11 software. Droplets of the fluid of interest were deposited on the vent material attached to glass slides using two sided tape. The slide-tape-vent assembly was tared off on an analytical balance and droplets of fluid were added on to regions of interest on the vent material surface until a mass of about 25 mg was reached. These slide-tape-vent assembly with droplets were then affixed to the tilt stage of the instrument. The sample surface was tilted in steps at the software default slow setting until the first angle at which a droplet was observed to move continuously. This angle was termed $\alpha$. The following equation was used to calculate the repellant power.

$$\text{Repellant Power (units of milli Newtons}^{-1}) = \frac{1}{\sin\alpha \times (\text{mass of the droplet in grams}) \times 9.8 \text{ m/s}^2} \times 1000$$

Example 1

One side of expanded PTFE material (porosity=53%, density=1.025 g/cc) was embossed with stamps photolithographically patterned from 1 oz copper and a polymeric photomask. 1 oz copper sided of FR-4 flame retardant epoxy woven glass composite circuit boards were laminated between two sheets of a positive polymeric photoresist. A positive transparency photo mask based on a CAD drawing was created by printing at 16,000 dpi (dots per inch) or greater. The photomask was contacted with one face of the photoresist laminate using vacuum and exposed to a UV light source to transfer the image. The laminate was then passed through a developing bath leaving behind the polymeric photoresist in the pattern of the photomask. The patterned laminated copper composite circuit boards were then etched to leave behind the pattern in copper topped with the polymer photoresist. Patterned stamps in 1 oz copper were used with the polymer photoresist left on top of the copper on the surface of the composite circuit board.

Figure 7:
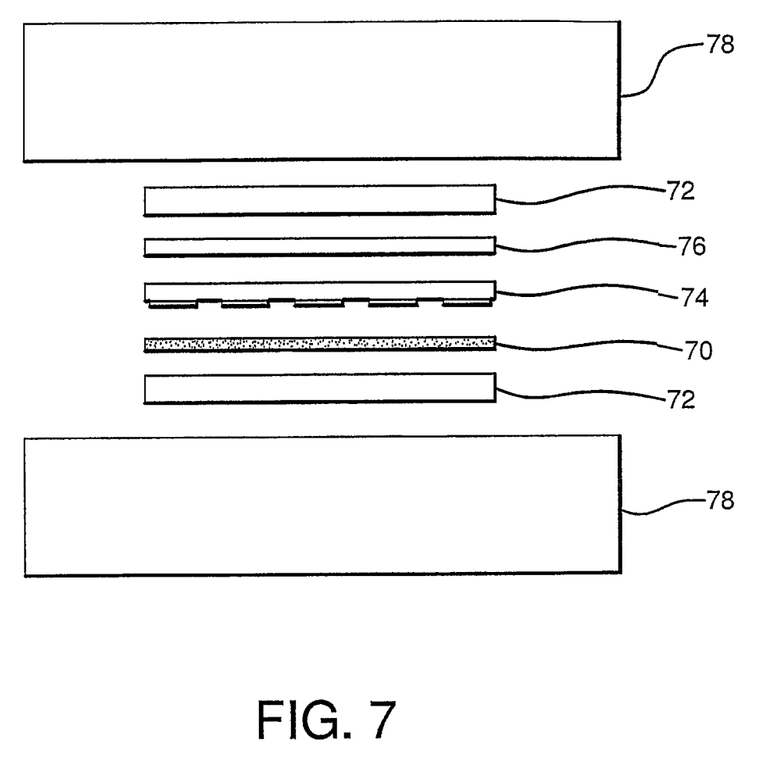
FIG. 7 shows a schematic of an embossing apparatus.

Embossing was carried out using the scheme depicted in FIG. 7. The PTFE material (70) was placed on top of a stainless steel plate (72) about 1.57 mm thick. The patterned stamp (74) was placed on top of the PTFE material. A Paco Pad (Part Number 5500-10 from Pacothane Technologies, NY) (76) was placed on top of the stamp, on top of which rested a second stainless steel plate (72) about 1.57 mm thick. The above sandwich was placed between the press platens (78) of a manual carver hydraulic press (Model Number 4350.L) and the platens were pressed together for approximately ten seconds. The platens were then opened and the sample was removed. The carver press reads the force applied to its platens. In this example, the compressive force applied was 2000 lbs.

After embossing, the filter material was coated from a 1.25 wt % solution of perfluorodioxole polymer (Teflon® AF 1600 from DuPont Fluoroproducts, Wilmington, Del.) to render the samples oleophobic; AATCC oil rating was measured to be 6.5.

Table I. shows the z axis differential and the percent coverage of the indentations in a given area (37.5 mm×37.5 mm).

Patterned oleophobic disks were tested for airflow recovery after exposure to challenge fluid V57S24. Testing was performed by exposing the patterned side to the challenge fluid. Testing was also performed by exposing the un-patterned side of the patterned oleophobic disks to the challenge fluid. Both tests resulted in the same air flow recovery. Results are reported in Table II.

TABLE I

|  | z axis differential (micron) | % coverage |
|---|---|---|
| Un-patterned PTFE | — | — |
| Pattern 7B | 15 | 19 |
| Pattern 7C | 15 | 38 |
| Pattern 13B | 45 | 7 |
| Pattern 13C | 25 | 40 |
| Pattern 13E | 55 | 4 |
| Pattern 13F | 55 | 2 |

TABLE II

|  | Permeability before fluid contact Gurley (secs) | Permeability after fluid contact Gurley (secs) | Air Flow Recovery (%) |
|---|---|---|---|
| Un-patterned PTFE | 43 | No flow (NR) | 0 |
| Pattern 7B | 55 | 102 | 54 |
| Pattern 7C | 37 | 46 | 80 |
| Pattern 13B | 42 | 106 | 40 |
| Pattern 13C | 54 | 84 | 64 |

TABLE II-continued

|  | Permeability before fluid contact Gurley (secs) | Permeability after fluid contact Gurley (secs) | Air Flow Recovery (%) |
|---|---|---|---|
| Pattern 13E | 47 | 96 | 49 |
| Pattern 13F | 40 | 55 | 72 |

Example 2

One side of expanded PTFE material (porosity=53%, density=1.025 g/cc) was embossed with stamps photolithographically patterned as described in Example 1, but from 5 oz copper and a polymeric photomask. Embossing was carried out at 2000 pounds of force using the carver press as described in Example 1.

Figure 8A:
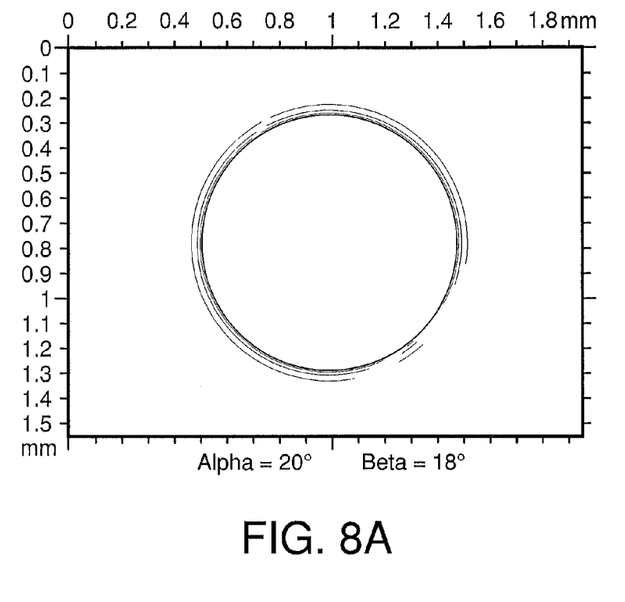
FIGS. 8A and 8B are optical profilometry images of an indentation.
Figure 8B:
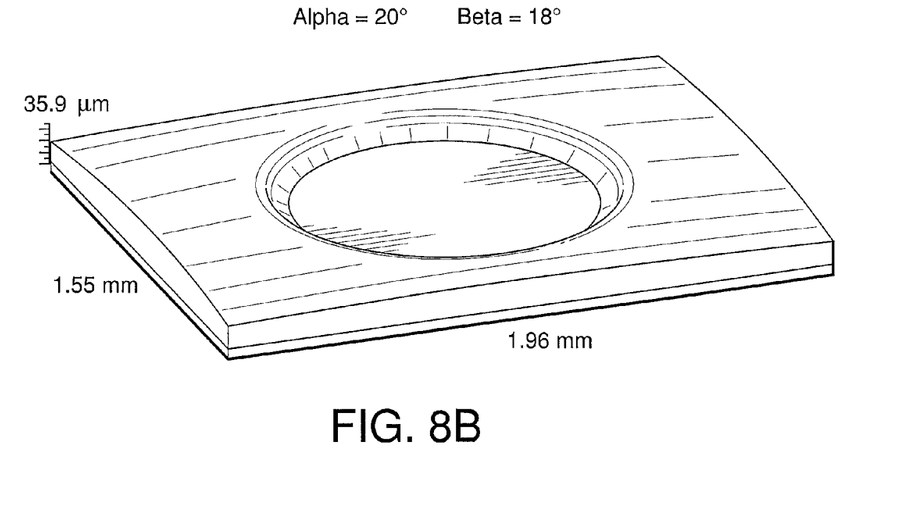

Table III shows the z axis differential and the percent coverage of indentations in a given area (37.5 mm×37.5 mm). FIGS. 8A and 8B show an optical profilometry image of an indentation in pattern 7A.

Patterned hydrophobic disks were tested for airflow recovery after exposure to challenge fluid V51S34. Testing was performed by exposing the patterned side to the challenge fluid. Testing was also performed by exposing the un-patterned side of the patterned disks to the challenge fluid. Both tests resulted in the same air flow recovery. Results are reported in Table IV.

Using V51S34 test fluid, repellant power tests were conducted. Table III lists the difference in repellant power of the patterned and un-patterned regions of samples with patterns 7A, 7B, and 7C. The repellant power of the un-patterned regions was estimated by measuring a control un-patterned sample. The repellant power of the patterned regions was estimated by compressing larger samples between flat press platens at the approximate pressure applied by the stamps. The approximate pressure during patterning is equal to the applied load divided by the stamp area. For example, in pattern 7C, the pressure during embossing is equal to the Load/Area=2000 lbs/0.4275 inches$^2$=10526 psi. The repellant power measured on an uncompressed control sample was 4.6 mN$^{-1}$. The difference in repellant power was determined by subtracting the compressed value from the uncompressed control sample value.

The repellant power was also measured directly on and adjacent to a patterned region of a square pattern shape. In one test, the droplet was placed on one of the square regions of the pattern and for another test, the droplet was placed on an un-patterned region adjacent to the edge of pattern. The repellent power of the compressed square region was 6.9 mN$^{-1}$ and the repellent power of the un-patterned region adjacent to the square region was 4.6 mN$^{-1}$.

TABLE III

|  | z axis differential (micron) | % coverage | Difference in Repellant Power (milli Newtons$^{-1}$) |
|---|---|---|---|
| Unpatterned PTFE | — | — |  |
| Pattern (7A) | 20 | 15 | 2.3 |
| Pattern (7B) | 15 | 19 | 2.3 |
| Pattern (7C) | 15 | 38 | 2.4 |

TABLE IV

|  | Permeability before liquid contact Gurley (secs) | Permeability after liquid contact Gurley (secs) | Air Flow Recovery (%) |
|---|---|---|---|
| Unpatterned PTFE | 28 | 162 | 17 |
| Pattern (7A) | 31 | 41 | 76 |
| Pattern (7B) | 37 | 46 | 80 |
| Pattern (7C) | 36 | 46 | 77 |
| Pattern (11) | 34 | 51 | 66 |

Example 3

One side of expanded PTFE material (porosity=53%, density=1.025 g/cc) was embossed with stamps photolithographically patterned as described in Example 2. Embossing was carried out at 54000 pounds of force using the carver press as described in Example 1.

After embossing, the filter material was coated from a 1.25 wt % solution of perfluorodioxole polymer to render the samples oleophobic; AATCC oil rating was measured to be 6.5.

Patterned (Patterns 7A, 7B, 7C) oleophobic disks were tested for pressure decay after exposure to challenge fluid V57S24. Patterned oleophobic disks (Patterns 13I, 13J) were tested for pressure decay after exposure to challenge fluid V57S27. Testing was performed by exposing the patterned side to the challenge fluid. Testing was also performed by exposing the un-patterned side of the patterned disks to the challenge fluid. Both tests resulted in the same pressure decay results. Results are reported in Table V.

TABLE V

|  | Pressure (initial) psi | Pressure Decay Pass or Fail |
|---|---|---|
| Un-patterned PTFE | 1.03 | FAIL |
| Pattern 7A | 1.03 | PASS |
| Pattern 7B | 1.03 | PASS |
| Pattern 7C | 1.03 | PASS |
| Pattern 13I | 0.995 | PASS |
| Pattern 13J | 0.995 | PASS |

While the invention has been disclosed herein in connection with certain embodiments and detailed descriptions, it will be clear to one skilled in the art that modifications or variations of such detail can be made without deviating from the spirit of the invention, and such modifications or variations are considered to be within the scope of the claims herein.

The invention claimed is:

1. A venting apparatus having an opening therein for venting an enclosure, said venting apparatus comprising:
   a gas-permeable, porous venting element affixed within said venting apparatus to cover said opening and forming a liquid-tight, gas-permeable seal of said opening, said porous venting element having a porous surface extending across the opening;
   said porous venting element comprising a polymeric membrane, having a porosity of less than 80% and a plurality of surface indentations in said porous surface, said plurality of surface indentations being defined by corresponding compressed regions in said porous surface in a portion of an area of said porous surface of said porous venting element that covers said opening, each of said plurality of surface indentations having a z axis differential of at least 12 microns from a top portion of said porous surface to an inner most surface of the surface indentation, wherein the porous surface includes a plurality of uncompressed regions adjacent the compressed regions, and wherein said plurality of surface indentations cover at least 20% of an area of the porous surface and provide an air flow recovery after liquid exposure greater than an air flow recovery of the uncompressed regions.

2. The venting apparatus of claim 1, wherein the z axis differential of each of said plurality of surface indentations is at least 15 micron.

3. The venting apparatus of claim 1, wherein the z axis differential of each of said plurality of surface indentations is at least 20 micron.

4. The venting apparatus of claim 1, wherein the z axis differential of each of said plurality of surface indentations is at least 25 micron.

5. The venting apparatus of claim 1, wherein the said porous venting element has a porosity of less than 75%.

6. The venting apparatus of claim 1, wherein the compressed regions have greater repellant power than the uncompressed regions in the porous surface.

7. The venting apparatus of claim 6, wherein the compressed regions have a repellant power of at least 1.3 milliNewton$^{-1}$ greater than the uncompressed regions.

8. The venting apparatus of claim 1, wherein the plurality of surface indentations cover at least about 40% area of the porous surface of the porous venting element.

9. The venting apparatus of claim 1, wherein said porous venting element has at least one oleophobic surface.

10. The venting apparatus of claim 1, wherein the porous venting element comprises PTFE.

11. The venting apparatus of claim 1, wherein the porous venting element comprises a material selected from the group consisting of Polysulfone, Polyethylene, vinyl polymers, styrenes, acrylates, Polypropylene, including Polycarbonate, Cellulose acetate, tetrafluoroethylene/hexafluoropropylenecopolymers (FEP), tetrafluoroethylene/perfluoroalkyl vinyl ether copolymers (PFA).

12. The venting apparatus of claim 1, wherein the porous venting element withstands water entry pressure of at least 0.5 psi without leakage.

13. The venting apparatus of claim 1 in which the compressed regions have a repellant power of at least 2.5 milliNewton$^{-1}$ greater than the uncompressed regions.

14. A method of venting a liquid tight enclosure, the method comprising:

providing an opening in the enclosure, providing a gas-permeable, porous polymer venting element having a porous surface and a porosity of less than 80%, forming indentations in a portion of said porous surface of said porous polymer, said indentations being defined by corresponding compressed regions, said indentations having a z axis differential greater than 12 microns from a top portion of said porous surface to an inner most surface of the indentation, and covering said opening with said porous polymer venting element to form a liquid-tight and gas-permeable seal of said opening, wherein said porous surface extends across said opening and said indentations are formed in a portion of an area of said porous surface covering said opening, wherein the porous surface includes a plurality of uncompressed regions adjacent the compressed regions, and wherein said plurality of surface indentations cover at least 20% area of the porous surface and provide an air flow recovery after liquid exposure greater than an air flow recovery of the uncompressed regions.

15. The method of claim 14, wherein the porous polymer venting element comprises an un-patterned base prior to said step of forming said indentations being defined by said compressed regions in the portion of the porous surface.

16. The method of claim 15, wherein the plurality of surface indentations improve the air flow recovery of the un-patterned base of the venting element by at least 5%.

17. The method of claim 15, wherein the plurality of surface indentations improve the air flow recovery of the un-patterned base venting element by at least 10%.

18. The method of claim 15, wherein the plurality of surface indentations improve the air flow recovery of the un-patterned base venting element by at least 15%.

19. The method of claim 14, said forming step comprising:
compressing said porous surface applying a compressive force to the porous surface so that the plurality of indentations are embossed on the porous venting element.

20. The method of claim 19, further comprising:
coating the porous venting element using a solution to render the porous venting element oleophobic.

21. The method of claim 19, said compressing step comprising:
pressing a photo lithographically patterned stamp on the porous surface using pressure.

* * * * *